United States Patent Office 3,271,437
5β-CYANO SUBSTITUTED A-NORPREGNANE AND A-NORANDROSTANE COMPOUNDS
Seymour David Levine, Princeton, N.J., assignor, by mesne assignments, to E. R. Squibb and Sons Inc., New York, N.Y., a corporation of Delaware
No Drawing. Filed Mar. 30, 1964, Ser. No. 355,913
7 Claims. (Cl. 260—464)

This invention relates to and has as its object the provision of novel physiologically active steroids and processes for their preparation. The final new products of this invention may be represented by the following formula:

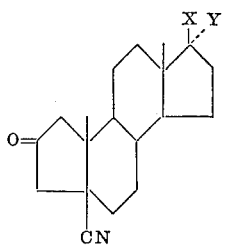

wherein X may be hydroxy, acyloxy or —COCH$_3$; Y is hydrogen; and together X and Y is oxo (O=).

The preferred acyloxy radicals are those of hydrocarbon carboxylic acids of less than twelve carbon atoms as exemplified by the lower alkanoic acids (e.g., acetic, propionic, butyric and tert.-pentanoic), the monocyclic aryl carbocyclic acids (e.g., benzoic and toluic acids), aryl lower alkanoic acids (e.g., phenacetic and β-phenylpropionic acid), the cycloalkane carboxylic acids and the cycloalkene carboxylic acids.

The compounds of this invention are physiologically active steroids which possess anti-androgenic activity, i.e., they inhibit the action of androgens, and they may be used in the treatment of such conditions as hyperandrogenic acne. The compounds may be formulated for such administration, the concentration and/or dosage being based on the activity of the particular compound and the requirements of the patient.

The compounds of this invention may be prepared by the processes of this invention beginning with A-nortestosterone or A-norprogesterone as starting material. The starting material is treated with a source of cyanide ion e.g., potassium cyanide, sodium cyanide or other like cyanide salts at an elevated temperature over an extended period of time to yield the respective 5β-cyano derivatives.

The obtain the 17-acyl derivatives of the compounds of this invention, the 17-hydroxy derivatives may be acylated as by treatment with an acylating agent e.g., acyl cloride or an acid anhydride in the presence of a base, for example, pyridine to yield the 17-acyloxy derivative of the 5β-cyano compounds.

Additionally, in order to obtain the 17-keto compounds, the 17-hydroxy derivatives may be treated with an oxidizing agent, for example, chromium trioxide.

The invention may be further illustrated by the following examples:

EXAMPLE 1

5β-cyano-A-norandrostane-17β-ol-2-one

A mixture of 900 mg. of A-nortestosterone, 429 mg. of potassium cyanide, 270 mg. of ammonium chloride, 15 ml. of methanol, and 3 ml. of water is refluxed for 43 hours. The reaction mixture is evaporated to dryness and diluted with water. The aqueous phase is extracted three times with chloroform, and the chloroform extracts are washed with 8% salt solution, dried over sodium sulfate and evaporated to dryness. Crystallization of the residue from isopropyl ether gives 526 mg. of 5β-cyano-A-nortestosterone having melting point 217–218°. Recrystallization from isopropyl ether gives the analytical sample having M.P. 218.5–219.5°; [α]$_D^{22}$ —74° (EtOH);

$\lambda_{Max.}^{KBr}$ 2.85, 4.50, and 5.74μ

τ Si(CH$_3$)$_4$ 9.22 (s, 18–Me), 8.61 (s, 19–Me), and 6.33 (m, 17–H).
Analysis.—Calc'd for C$_{19}$H$_{27}$O$_2$N (301.41): C, 75.71; H, 9.03; N, 4.65. Found: C, 75.80; H, 8.96; N, 4.60.

EXAMPLE 2

5β-cyano-A-norpregnane-2,20-dione

Following the procedure of Example 1 but substituting A-norprogesterone for A-nortestosterone there is obtained 5β-cyano - A - norprogesterone having M.P. 138–139°; [α]$_D^{22}$ 0° (EtOH);

$\lambda_{Max.}^{KBr}$ 4.50, 5.74, and 5.92μ

τ Si(CH$_3$)$_4$ 9.34 (s, 18–Me), 8.62 (s, 19–Me) and 7.87 (m, 21–Me).
Analysis.—Calc'd for C$_{21}$H$_{29}$O$_2$N (327.45): C, 77.02; H, 8.93; N, 4.28. Found: C, 76.95; H, 8.99; N, 4.46.

EXAMPLE 3

5β-cyano-A-norandrostane-17β-ol-2-one-17-acetate

To a solution of 10 g. of 5β-cyano-A-nortestosterone in 50 ml. of anhydrous pyridine is added 10 ml. acetic anhydride, and the mixture is allowed to remain at room temperature for eighteen hours. Crushed ice and water is then added slowly and the resulting precipitate is filtered, washed thoroughly with water and dried to give 5β-cyano-A-norandrostane-17β-ol-2-one-17-acetate.

Similarly, by substituting other acid anhdyrides or acyl halides for the acetic anhydride in the procedure of Example 3, the corresponding 17 esters are formed. Thus butyric anhydride and benzoyl chloride afford the 17-butyrate and the 17-benzoate, respectively.

EXAMPLE 4

5β-cyano-A-norandrostane-2,17-dione

A solution of 180 mg. of 5β-cyano-A-norandrostane 17β-ol-3-one in 7 ml. of acetone is treated dropwise with stirring with an excess of chromium trioxide sulfuric acid. The reaction mixture is stirred for four minutes and then two drops of ethanol are added. The acetone is decanted and the inorganic residue washed with additional acetone. The acetone fractions are combined and diluted with water. Filtration gives 150 mg. of 5β - cyano - A-norandrostane-2,17-dione having melting point 225–226°; [α]$_D^{22}$ —19° (EtOH);

$\lambda_{Max.}^{KBr}$ 4.50, and 5.74 mμ

τ Si(CH$_3$)$_4$ 9.11 (s, 18–Me) and 8.60 (s, 19–Me).
Analysis.—Calc'd for C$_{19}$H$_{25}$O$_2$N (299.40): C, 76.22; H, 8.42; N, 4.68. Found: C, 76.04; H, 8.46; N, 4.79.

The invention may be variously otherwise embodied within the scope of the appended claims.
What is claimed is:
1. A composition of the formula

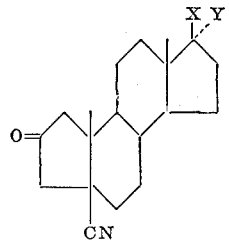

wherein X is selected from the group consisting of hydroxy the acyloxy radical of a hydrocarbon carboxylic acid of less than twelve carbon atoms and —COCH$_3$; Y is hydrogen; and together X and Y is oxo (O=).

2. 5β-cyano-A-norandrostane-17β-ol-2-one.
3. 5β-cyano-A-norpregnane-2,20-dione.
4. 5β-cyano-A-norandrostane-17β-ol-2-one 17 - acetate.
5. 5β-cyano-A-norandrostane 2,17-dione.
6. The process for preparing a compound selected from the group consisting of 5β-cyano-A-norandrostane-17β-ol-2-one and 5β-cyano-A-norpregnane-2,20-dione which comprises reacting a compound selected from the group consisting of A-nortestosterone and A-norprogesterone, respectively, with a solution of cyanide ions at an elevated temperature.
7. The process of claim 6 wherein the solution of cyanide ions is a cyanide salt.

No references cited.

CHARLES B. PARKER, *Primary Examiner.*

J. P. BRUST, *Assistant Examiner.*